United States Patent
Grimm et al.

(10) Patent No.: US 12,252,439 B2
(45) Date of Patent: Mar. 18, 2025

(54) TUBE-DRAWABLE GLASS, METHOD FOR THE PRODUCTION AND USE

(71) Applicant: Schott AG, Mainz (DE)

(72) Inventors: Malte Grimm, Mitterteich (DE); Rainer Erwin Eichholz, Frankfurt am Main (DE); Ralf Biertümpfel, Mainz-Kastel (DE)

(73) Assignee: Schott AG, Mainz (DE)

(*) Notice: Subject to any disclaimer, the term of this patent is extended or adjusted under 35 U.S.C. 154(b) by 394 days.

(21) Appl. No.: 17/127,396

(22) Filed: Dec. 18, 2020

(65) Prior Publication Data

US 2021/0188696 A1 Jun. 24, 2021

(30) Foreign Application Priority Data

Dec. 20, 2019 (EP) .................................. 19401057
Aug. 25, 2020 (DE) .................... 10 2020 122 220.3

(51) Int. Cl.

| C03C 3/076 | (2006.01) |
| C03C 3/083 | (2006.01) |
| C03C 3/085 | (2006.01) |
| C03C 3/091 | (2006.01) |
| C03C 3/093 | (2006.01) |
| C03C 4/02 | (2006.01) |
| C03C 4/10 | (2006.01) |
| C03C 21/00 | (2006.01) |
| G01S 7/481 | (2006.01) |
| G01S 17/931 | (2020.01) |
| G02B 5/20 | (2006.01) |
| G02B 5/22 | (2006.01) |

(52) U.S. Cl.
CPC .............. *C03C 3/076* (2013.01); *C03C 3/083* (2013.01); *C03C 3/085* (2013.01); *C03C 3/091* (2013.01); *C03C 3/093* (2013.01); *C03C 4/02* (2013.01); *C03C 4/10* (2013.01); C03C 21/002 (2013.01); C03C 2203/10 (2013.01); C03C 2203/50 (2013.01); *G01S 7/4813* (2013.01); *G01S 17/931* (2020.01); *G02B 5/208* (2013.01); *G02B 5/226* (2013.01)

(58) Field of Classification Search
CPC ......... C03C 3/083; C03C 3/089; C03C 3/091; C03C 3/093; C03C 3/076; C03C 3/085; C03C 4/02
See application file for complete search history.

(56) References Cited

U.S. PATENT DOCUMENTS

| 6,071,840 A | 6/2000 | Sasage et al. |
| 11,465,929 B2 | 10/2022 | Lautenschläger et al. |
| 2016/0031747 A1 | 2/2016 | Yamamoto et al. |
| 2017/0217825 A1 | 8/2017 | Hasegawa et al. |
| 2018/0079679 A1* | 3/2018 | Kass .......................... C03C 4/20 |
| 2019/0284086 A1 | 9/2019 | Fedullo et al. |
| 2019/0382303 A1 | 12/2019 | Grimm et al. |
| 2021/0132273 A1* | 5/2021 | Yamamoto ............. G02B 5/285 |
| 2021/0191014 A1* | 6/2021 | Schreder ................ C03C 3/093 |
| 2021/0309561 A1 | 10/2021 | Bogaerts et al. |
| 2022/0380248 A1* | 12/2022 | Li ........................... B60R 11/00 |

FOREIGN PATENT DOCUMENTS

| JP | H07-126036 A | 5/1995 |
| SU | 321485 A1 | 1/1972 |
| SU | 0920016 A1 * | 4/1982 |
| WO | 2019/009336 A1 | 1/2019 |
| WO | 2019/030106 A1 | 2/2019 |
| WO | 2019/065643 A1 | 4/2019 |
| WO | 2020/204194 A1 | 10/2020 |

OTHER PUBLICATIONS

Extended European Search Report dated Jun. 24, 2020 for European Patent Application No. 19 40 1057 (7 pages).
"Chemical Abstracts", 113, No. 2, Columbus, Ohio, Jul. 9, 1990 (1 page).
Extended European Search Report dated Aug. 5, 2022 for European Patent Application No. 22152321.0 (8 pages).
"Optics and photonics—Specification of optical raw glass", DIN ISO 12123:2018 (34 pages).
"Glass—Water resistance of glass semolina at 98 degC—Test methods and classifications", DIN ISO 719:1989 (16 pages).
"Water resistance of glass grit at 121 degC", DIN ISO 720:1985 (8 pages).
"Glass—Resistance to boiling aqueous mixed liquor", DIN ISO 695:1991 (7 pages).
"Testing the resistance of glass to attach by boiling hydrochloric acid solution, and classification", DIN ISO 12116:1976 (5 pages).
"Coating materials—Testing of stone impact resistance of coatings—Part 1: Multi-impact test", DIN ISO 20567-1:207 (21 pages).
"Preparations of steel substrates before application of paints and related products—Specifications for metallic blast-cleaning abrasives—Part 2: Chilled-iron grit", DIN ISO 11124-2:1997 (13 pages).
"Preparation of steel substrates before applications of paints and related products—Test methods for metallic blast-cleaning abrasives—Part 2: Determination of particle size distribution", DIN ISO 11125-2:2018 (13 pages).
"Test Sieves—Metal Wire cloth, perforated metal plate and electroformed sheet—Nominal sizes of openings", DIN ISO 565:1990 (7 pages).

* cited by examiner

*Primary Examiner* — Elizabeth A. Bolden
(74) *Attorney, Agent, or Firm* — Taylor IP, P.C.

(57) ABSTRACT

A glass has a maximum crystallization rate ($KG_{max}$) of at most 0.20 μm/min in a temperature range of 700° C. to 1250° C. and a hydrolytic stability according to a hydrolytic class 1 HGA1 according to ISO 720:1985. In the case of a sample thickness of 2 mm of the glass, a ratio of a minimum transmittance in a wavelength range of 850 nm to 950 nm to a maximum transmittance in a wavelength range of 250 nm to 700 nm is in a range of 1.9:1 to 15:1.

11 Claims, 1 Drawing Sheet

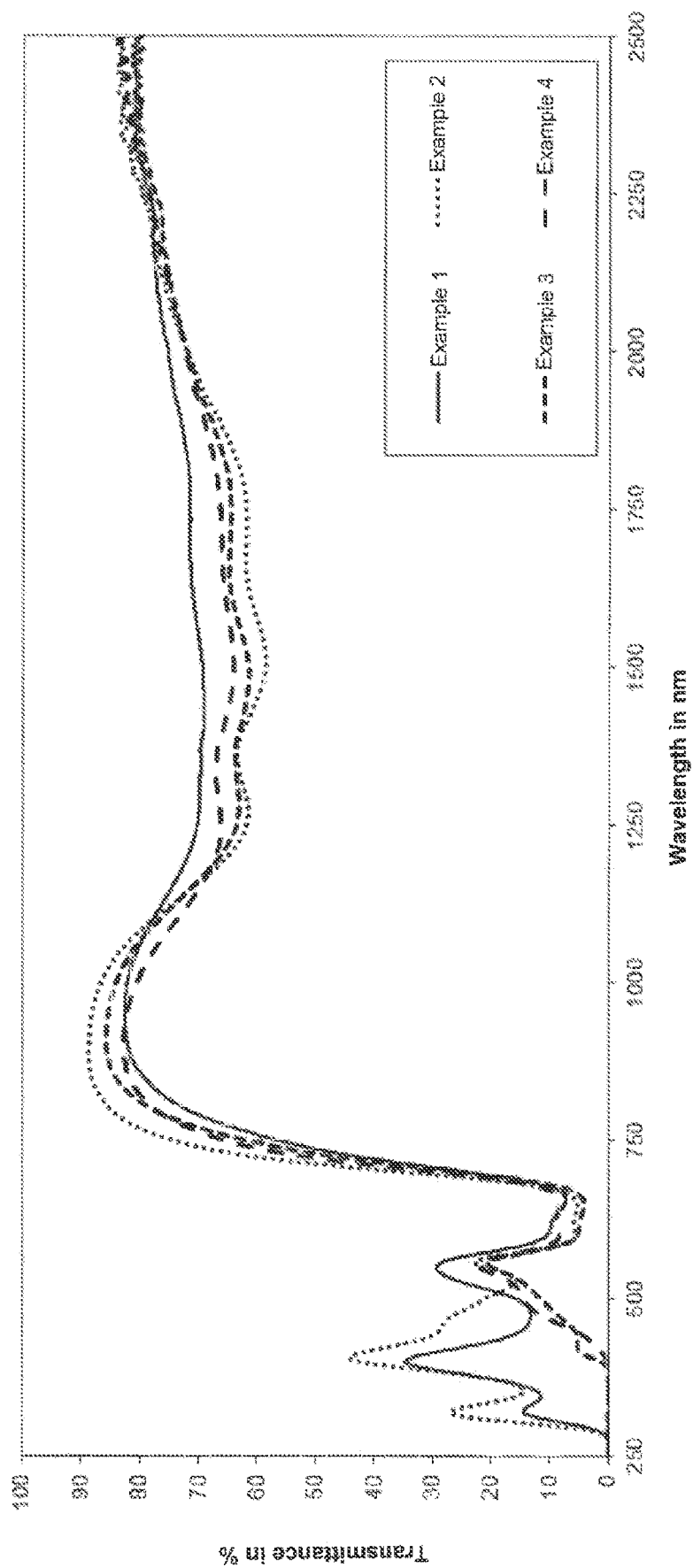

TUBE-DRAWABLE GLASS, METHOD FOR THE PRODUCTION AND USE

CROSS REFERENCE TO RELATED APPLICATIONS

This application claims priority to European Patent Application EP 19401057.5 filed on Dec. 20, 2019, and German Patent Application DE 10 2020 122 220.3, filed on Aug. 25, 2020, which are both incorporated herein by reference.

BACKGROUND OF THE INVENTION

1. Field of the Invention

The present invention relates to a tube-drawable glass, in particular with good hydrolytic stability and good chemical temperability, a method for the production of the glass and the use of the glass. In particular, the glass provided according to the present invention can be used in the field of LIDAR ("Light Detection And Ranging"), in particular as LIDAR housing or LIDAR covering.

2. Description of the Related Art

LIDAR systems normally comprise a laser with emission in the near infrared range (NIR range), in particular at wavelengths of higher than 780 nm. The electromagnetic radiation emitted by the laser is at least partially reflected by objects which are present in the surroundings of the LIDAR system and the reflected radiation is recorded by respective sensors of the system. Based on the recorded radiation patterns the LIDAR system is able to identify objects. Based on the so-called time-of-flight (ToF) method also distances can be determined. Some LIDAR systems are able to determine the speed of objects based on phase differences between emitted and reflected radiation.

LIDAR systems have become more important, because they can be used in particular in the field of autonomous driving which has recently received more and more attention. LIDAR systems are also used in numerous other fields, such as for example in the robot technology, for drones, satellites, in ship engineering, in mining, in building industry, in the railroad sector and in many other fields.

For shielding the sensitive opto-electronic components from environmental influences, LIDAR systems need an enclosure which separates the sensitive components from the environment. But this enclosure has to allow that the radiation emitted from the LIDAR laser can escape outside and, conversely, that the radiation reflected by the objects again can reach the detectors inside, for guaranteeing the operability of the system. Furthermore, the enclosure should be designed such that visible light from outside cannot enter it or can only enter it in a very small extent. The same applies to the opposite direction of visible light from inside to outside. The reason for that is that, on the one hand, the components which are located inside should not be visible from outside, because this often may be found disturbing. In addition, also the interior should be protected from disturbing radiation from outside which may damage components or negatively influence measuring results.

Until today, often such enclosures have been produced from polymer materials, in particular from polycarbonate (PC) or polymethyl methacrylate (PMMA). But such materials have disadvantages, in particular with respect to the scratch resistance, the mechanical resistance and the chemical stability. Glass, for example, can more efficiently protect the technical sensor facilities against penetrating water (permeability) and other environmental influences (for example in the case of cars against salt on the street, exhaust gases, stresses in car-wash plants) than polymer materials.

Particularly suitable is so-called black glass which has high transmittance in the NIR range and low transmittance in the visible range. For example, a glass with high transmittance in the NIR range and low transmittance in the visible range is described in WO 2019/065643 A1 or in JP H07-126036 A.

But the known glasses have the disadvantage that they cannot be produced with the help of the so-called A-drawing method. The A-drawing method is a known method for the production of tube glass. In contrast to the Danner method or the Vello method, with the A-drawing method glass tubes having a diameter of 10 cm or more can be produced. Such glass tubes are particularly advantageous for the production of LIDAR enclosures, since LIDAR systems normally comprise enclosures in the form of ring-shaped hollow cylinders. For the producibility with the A-drawing method glasses have to be characterized by certain properties, in particular by a crystallization resistance which is sufficient for tube-drawing. In particular, the drawability of the glass because of low devitrification and a low dependency of the transmittance on the shaping parameters are particularly important. Black glass known so far is not characterized by such properties. In particular, thermally temper-colored glass, thus glass which is colored only by a thermal post-treatment (thermal temper-coloring process) is not suitable, because here a high dependency of the transmittance on shaping parameters exists, because there is no color system on the basis of oxides.

A high crystallization resistance is particularly important for the production in a tube-drawing method. Otherwise it is possible that devitrification crystals are formed, in particular at the glass surface, so that, for example, the shaping of the glass is compromised. In addition, when it is used later in a LIDAR system, it could be possible that through devitrification crystals scattering effects and as a consequence thereof aberrations occur and that an incorrect image of the environment is obtained. Therefore, the glasses should have good devitrification stability. This is particularly important for large sizes and thick walls.

A further disadvantage of the glasses which are known until today is that they have, in comparison to polymer materials, only moderately improved chemical stability. In this regard, further improvements would be desirable, in particular for outdoor uses. In addition, it should be possible that the glass can chemically be tempered for improving the stability with respect to environmental influences (such as, for example, hail). Furthermore, the glasses should be characterized by a good melting capability.

SUMMARY OF THE INVENTION

In some exemplary embodiments provided according to the present invention, a glass has a maximum crystallization rate ($KG_{max}$) of at most 0.20 µm/min in a temperature range of 700° C. to 1250° C., in particular in the case, when the glass is thermally treated for an exposure time of one hour in a gradient furnace with increasing temperature regimen, and with a hydrolytic stability according to the hydrolytic class 1 according to ISO 720. In the case of a sample thickness of 2 mm, the ratio of the minimum transmittance in the wavelength range of 850 nm to 950 nm to the maximum transmittance in the wavelength range of 250 nm to 700 nm is in a range of 1.9:1 to 15:1.

In some exemplary embodiments provided according to the present invention, a glass has a maximum crystallization rate ($KG_{max}$) of at most 0.20 μm/min in a temperature range of 700° C. to 1250° C. and a hydrolytic stability according to a hydrolytic class 1 HGA1 according to ISO 720:1985. In the case of a sample thickness of 2 mm of the glass, a ratio of a minimum transmittance in a wavelength range of 850 nm to 950 nm to a maximum transmittance in a wavelength range of 250 nm to 700 nm is in a range of 1.9:1 to 15:1.

In some exemplary embodiments provided according to the present invention, a glass article includes a glass and has a thickness in a range of 0.02 mm to 5 mm. The glass has a maximum crystallization rate ($KG_{max}$) of at most 0.20 μm/min in a temperature range of 700° C. to 1250° C. and a hydrolytic stability according to a hydrolytic class 1 HGA1 according to ISO 720:1985. In the case of a sample thickness of 2 mm of the glass, a ratio of a minimum transmittance in a wavelength range of 850 nm to 950 nm to a maximum transmittance in a wavelength range of 250 nm to 700 nm is in a range of 1.9:1 to 15:1.

In some exemplary embodiments provided according to the present invention, a method for the production of a glass or a glass article including the glass includes: melting glass raw materials to form a glass melt; treating the glass melt to form a treated glass melt; and cooling the treated glass melt to obtain the glass or the glass article including the glass. The glass has a maximum crystallization rate ($KG_{max}$) of at most 0.20 μm/min in a temperature range of 700° C. to 1250° C. and a hydrolytic stability according to a hydrolytic class 1 HGA1 according to ISO 720:1985. In the case of a sample thickness of 2 mm of the glass, a ratio of a minimum transmittance in a wavelength range of 850 nm to 950 nm to a maximum transmittance in a wavelength range of 250 nm to 700 nm is in a range of 1.9:1 to 15:1.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

The sole FIGURE illustrates a transmittance spectrum of one sample each of example glasses 1 to 4 in the wavelength range of 250 nm to 2500 nm; for the measurement of the spectra, samples with a wall thickness of ca. 2 mm (1.96 to 2.01 mm) were used. Since the spectra can be compared only in the case of exactly the same sample thickness, thicknesses which deviated from 2 mm were converted into 2 mm each.

The exemplifications set out herein illustrate embodiments of the invention and such exemplifications are not to be construed as limiting the scope of the invention in any manner.

DETAILED DESCRIPTION OF THE INVENTION

Exemplary embodiments provided according to the present invention relate to a glass that has a maximum crystallization rate ($KG_{max}$) of at most 0.20 μm/min in a temperature range of 700° C. to 1250° C., in particular in the case when the glass is thermally treated for an exposure time of one hour in a gradient furnace with increasing temperature regimen, and with a hydrolytic stability according to the hydrolytic class 1 according to ISO 720. In the case of a sample thickness of 2 mm, the ratio of the minimum transmittance in the wavelength range of 850 nm to 950 nm to the maximum transmittance in the wavelength range of 250 nm to 700 nm is in a range of 1.9:1 to 15:1.

In some exemplary embodiments provided according to the present invention, a glass comprises cations of the following components in the given portions (in % by cation):

| Component | Portion |
| --- | --- |
| silicon | 40-80 |
| boron | 0-20 |
| aluminum | 0-25 |
| sodium | 2-22 |
| potassium | 0.1-10 |
| chromium | 0.05-0.5 |
| cobalt | 0.03-0.5 | a sum of the portions of the cations of sodium and potassium is in a range of 10 to 25% by cation, a sum of the portions of the cations of chromium and cobalt is in a range of 0.15 to 0.55% by cation, and a sum of the portions of the cations of magnesium, calcium, strontium, barium and zinc is at most 15% by cation.

In particular, the present invention relates to a glass with a maximum crystallization rate ($KG_{max}$) of at most 0.20 μm/min in a temperature range of 700° C. to 1250° C., when the glass is thermally treated for an exposure time of one hour in a gradient furnace with increasing temperature regimen, and with a hydrolytic stability according to the hydrolytic class 1 according to ISO 720. In the case of a sample thickness of 2 mm, a ratio of a minimum transmittance in a wavelength range of 850 nm to 950 nm to a maximum transmittance in a wavelength range of 250 nm to 700 nm is in a range of 1.9:1 to 15:1, and the glass comprises cations of the following components in the given portions (in % by cation):

| Component | Portion |
| --- | --- |
| silicon | 40-80 |
| boron | 0-20 |
| aluminum | 0-25 |
| sodium | 2-22 |
| potassium | 0.1-10 |
| chromium | 0.05-0.5 |
| cobalt | 0.03-0.5 | a sum of the portions of the cations of sodium and potassium is in a range of 10 to 25% by cation, a sum of the portions of the cations of chromium and cobalt is in a range of 0.15 to 0.55% by cation, and a sum of the portions of the cations of magnesium, calcium, strontium, barium and zinc is at most 15% by cation.

Partially, exemplary embodiments provided according to the present invention are based on the advantageous adjustment of molar ratios of the cations to each other. Therefore, it makes sense to specify the glass composition in % by cation. The glass also comprises anions. However, the core of exemplary embodiments provided according to the present invention consists in the cation composition.

The term percent by cation (abbreviated "% by cation") describes the relative molar portion of the respective cations in relation to the total portion of all cations in the glass. Here, the relative molar portions of the anions in relation to the total portion of all anions in the glass are given in percent by anion (abbreviated "% by anion"). In the present disclosure, the terms "percent by cation" and "cation percent" are used interchangeably. The term "cation percent" is abbreviated as "cat.-%". Likewise, the terms "percent by anion" and "anion percent" are used interchangeably. The term "anion percent" is abbreviated as "anion-%".

In addition to the cations, the glasses comprise anions. In some embodiments, the anions are selected from the group consisting of $O^{2-}$, $F^-$, $Br^-$, $Cl^-$ and $SO_4^{2-}$. The molar portion of $O^{2-}$ in relation to the total amount of the anions may be at least 50% by anion, such as at least 70% by anion, at least 90% by anion, at least 98% by anion, or at least 99% by anion. In some embodiments, the glass is nearly completely oxidic, thus exclusively contains $O^{2-}$ as anions and is free of other anions.

The glasses provided according to the present invention can contain anions of halogens, in particular anions of F, Cl and/or Br. In some embodiments, the sum of the portions of anions of F, Cl and Br is at most 20% by anion, such as at most 10% by anion, at most 5% by anion, at most 3% by anion, or at most 1% by anion. In some embodiments, the glass is free of anions of F, Cl and/or Br or contains anions of F, Cl and Br in a portion of at most 3% by anion, at most 2% by anion or at most 1% by anion each. In some embodiments, the glass contains $Cl^-$, for example, in a portion of at least 0.1% by anion, at least 0.2% by anion, at least 0.5% by anion, at least 1% by anion, at least 2% by anion or at least 3% by anion, in particular of 0.5 to 10% by anion or of 1 to 5% by anion.

When it is mentioned that the glass contains cations of a certain component in a portion which is given in % by cation, then this means that this information relates to the total molar portion of all cation species of the mentioned component, unless otherwise stated. When, for example, a component M can be present in the glass in different oxidation states, for example as $M^{2+}$ and as $M^{3+}$, then the information that the glass contains cations of M in a portion of x % by cation means that the sum of the portions of $M^{2+}$ and $M^{3+}$ in the glass is x % by cation.

The glasses provided according to the present invention may comprise cations of silicon (in particular $Si^{4+}$) in a portion of 40 to 80% by cation, such as of 45 to 75% by cation or of 50 to 70% by cation. The portion of cations of silicon may, for example, be 40 to 70% by cation, 45 to 70% by cation, or 60 to 70% by cation. Cations of silicon in these portions may be advantageous with regard to the chemical stability and the hot formability of the glass. Very high contents of cations of silicon, however, result in an increase of the energy demand for smelting the glass. The amount of cations of silicon may, for example, be at least 40 cat.-%, at least 45 cat.-%, at least 50 cat.-%, or at least 60 cat.-%. The amount of cations of silicon may, for example, be at most 80 cat.-%, at most 75 cat.-%, or at most 70 cat.-%.

The glasses provided according to the present invention can contain cations of boron (in particular $B^{3+}$), in particular in a portion of 0 to 20% by cation, for example of 1 to 19% by cation, of 2 to 18% by cation or of 5 to 15% by cation. In some embodiments provided according to the present invention, the portion of cations of boron is lower than 5% by cation, lower than 2% by cation, lower than 1% by cation, lower than 0.5% by cation or lower than 0.1% by cation. The glasses provided according to the present invention may be free of cations of boron. The portion of cations of boron may, for example, be 1 to 15% by cation or 5 to 10% by cation. Cations of boron function as network modifiers and may possibly compromise the solubility of cations of chromium. Therefore, in some embodiments, the portion of cations of boron is limited. The amount of cations of boron may, for example, be at least 1 cat.-%, at least 2 cat.-%, or at least 5 cat.-%. The amount of cations of boron may, for example, be at most 20 cat.-%, at most 19 cat.-%, at most 18 cat.-%, at most 15 cat.-%, or at most 10 cat.-%.

The glasses provided according to the present invention can contain cations of aluminum (in particular $Al^{3+}$), in particular in a portion of 0 to 25% by cation, for example 1 to 22.5% by cation, 2 to 20% by cation, 3 to 15% by cation or of 5 to 12% by cation. In some embodiments, the portion of cations of aluminum is lower than 5% by cation, lower than 2% by cation, lower than 1% by cation, lower than 0.5% by cation or lower than 0.1% by cation. The glasses provided according to the present invention may be free of cations of aluminum. The portion of cations of aluminum may, for example, be 0 to 2% by cation, 0.1 to 1.5% by cation or 0.5 to 1% by cation. Cations of aluminum function as network modifiers and can increase the devitrification stability of the glasses. But aluminum containing raw materials often introduce water into the melt so that bubbles of water vapor can occur which only hardly can be removed by refining. Therefore, in some embodiments, the portion of cations of aluminum is within the above-mentioned ranges. The amount of cations of aluminum may, for example, be at least 0.1 cat.-%, at least 0.5 cat.-%, at least 1 cat.-%, at least 2 cat.-%, at least 3 cat.-%, or at least 5 cat.-%. The amount of cations of aluminum may, for example, be at most 25 cat.-%, at most 22.5 cat.-%, at most 20 cat.-%, at most 15 cat.-%, at most 12 cat.-%, at most 2 cat.-%, at most 1.5 cat.-%, or at most 1 cat.-%.

The glasses provided according to the present invention may comprise cations of sodium (in particular $Na^+$) in a portion of 2 to 22% by cation, such as of 3 to 20% by cation, of 4 to 18% by cation, of 5 to 17% by cation, for example of 6 to 16% by cation or of 8 to 14% by cation. The portion of cations of sodium may, for example, be 12 to 20% by cation or 14 to 18% by cation. Cations of sodium may increase the solubility of hardly soluble components such as, for example, cations of chromium and cobalt. In addition, cations of sodium may be advantageous with regard to the ability of the glasses for being chemically hardened by ion exchange. On the other hand, cations of sodium may compromise the chemical stability. The amount of cations of sodium may, for example, be at least 2 cat.-%, at least 3 cat.-%, at least 4 cat.-%, at least 6 cat.-%, at least 8 cat.-%, at least 12 cat.-%, or at least 14 cat.-%. The amount of cations of sodium may, for example, be at most 22 cat.-%, at most 20 cat.-%, at most 18 cat.-%, at most 17 cat.-%, at most 16 cat.-%, or at most 14 cat.-%.

The glasses provided according to the present invention may comprise cations of potassium (in particular $K^+$) in a portion of 0.1 to 10% by cation, such as of 0.5 to 9% by cation, of 1 to 8% by cation, for example of 1.5 to 7.5% by cation or of 2 to 5% by cation. The portion of cations of potassium may, for example, be 5 to 10% by cation or 6 to 9.5% by cation. In contrast, cations of potassium can increase the chemical stability. But their contribution to the increase of the solubility of cations of chromium and cobalt is not so high. In addition, high portions of cations of potassium have a negative influence onto the exchangeability. The amount of cations of potassium may, for example, be at least 0.1 cat.-%, at least 0.5 cat.-%, at least 1 cat.-%, at least 1.5 cat.-%, at least 2 cat.-%, at least 5 cat.-%, or at least 6 cat.-%. The amount of cations of potassium may, for example, be at most 10 cat.-%, at most 9.5 cat.-%, at most 9 cat.-%, at most 7.5 cat.-%, or at most 5 cat.-%.

In some embodiments, the glasses provided according to the present invention contain both, cations of sodium and cations of potassium. The sum of the portions of the cations of sodium and potassium may be in a range of 10 to 25% by cation, such as of 11 to 22.5% by cation, of 12 to 20% by cation, for example 15 to 20% by cation. This has positive influences onto the melting and refining behavior. In addition, the solubility of cations of cobalt and chromium is increased. The sum of the portions of the cations of sodium and potassium may, for example, be at least 10 cat.-%, at least 11 cat.-%, at least 12 cat.-%, or at least 15 cat.-%. The sum of the portions of the cations of sodium and potassium may, for example, be at most 25 cat.-%, at most 22.5 cat.-%, or at most 20 cat.-%.

With regard to the previously described partially different properties and effects of cations of sodium and potassium, the ratio of the molar portion of cations of sodium (in % by cation) to the molar portion of cations of potassium (in % by cation) may be in a range of 0.5:1 to 25:1, for example 1:1 to 20:1, 1.5:1 to 15:1 or 2:1 to 10:1. The ratio of the molar portion of cations of sodium (in % by cation) to the molar portion of cations of potassium (in % by cation) may, for example, be at least 0.5:1, at least 1:1, at least 1.5:1, or at least 2:1. The ratio of the molar portion of cations of sodium (in % by cation) to the molar portion of cations of potassium (in % by cation) may, for example, be at most 25:1, at most 20:1, at most 15:1, or at most 10:1.

In some embodiments, the glasses provided according to the present invention contain, besides cations of sodium and potassium, no or only low portions of cations of other alkali metals. In particular, the portion of cations of lithium may be lower than 1% by cation, such as lower than 0.5% by cation or lower than 0.1% by cation. In some embodiments, the glasses are free of cations of other alkali metals than sodium and potassium, in particularly free of cations of lithium. It has been found that cations of lithium can increase the devitrification rate.

Such as described previously, the glasses provided according to the present invention are particularly advantageous for uses which require a low transmittance in the visible range and a high transmittance in the NIR range, for example in the case of housings or coverings in the LIDAR field.

One of the components which can be used according to the present invention for achieving these spectral properties are cations of chromium. The glasses provided according to the present invention may comprise cations of chromium in a portion of 0.05 to 0.5% by cation, such as of 0.1 to 0.4% by cation or of 0.15 to 0.3% by cation. The portion of cations of chromium may, for example, be 0.05 to 0.4% by cation, 0.1 to 0.3% by cation or 0.15 to 0.25% by cation. The amount of cations of chromium may, for example, be at least 0.05 cat.-%, at least 0.1 cat.-%, or at least 0.15 cat.-%. The amount of cations of chromium may, for example, be at most 0.5 cat.-%, at most 0.4 cat.-%, at most 0.3 cat.-%, or at most 0.25 cat.-%.

A further component which may be used for the adjustment of the spectral properties are cations of cobalt. The glasses provided according to the present invention may comprise cations of cobalt in a portion of 0.03 to 0.5% by cation, such as of 0.04 to 0.3% by cation, of 0.05 to 0.2% by cation, or of 0.06 to 0.15% by cation. The portion of cations of cobalt may, for example, be 0.04 to 0.4% by cation, 0.05 to 0.3% by cation, 0.06 to 0.2 or 0.07 to 0.16% by cation. The amount of cations of cobalt may, for example, be at least 0.03 cat.-%, at least 0.04 cat.-%, at least 0.05 cat.-%, at least 0.06 cat.-%, or at least 0.07 cat.-%. The amount of cations of cobalt may, for example, be at most 0.5 cat.-%, at most 0.4 cat.-%, at most 0.3 cat.-%, at most 0.2 cat.-%, at most 0.16 cat.-%, or at most 0.15 cat.-%.

In some embodiments, the glasses provided according to the present invention comprise both cations of chromium and cations of cobalt. In some embodiments, the sum of the portions of the cations of chromium and cobalt is in a range of 0.15 to 0.55% by cation, such as of 0.17 to 0.50% by cation, of 0.19 to 0.45% by cation, of 0.21 to 0.40% by cation, of 0.23 to 0.35% by cation, or of 0.25 to 0.30% by cation. The sum of the portions of the cations of chromium and cobalt may, for example, be at least 0.15 cat.-%, at least 0.17 cat.-%, at least 0.19 cat.-%, at least 0.21 cat.-%, at least 0.23 cat.-%, or at least 0.25 cat.-%. The sum of the portions of the cations of chromium and cobalt may, for example, be at most 0.55 cat.-%, at most 0.50 cat.-%, at most 0.45 cat.-%, at most 0.40 cat.-%, at most 0.35 cat.-%, or at most 0.30 cat.-%.

It has been found that it is particularly advantageous for the spectral properties of the glasses when cations of chromium are present in a molar excess to cations of cobalt. In some embodiments, the ratio of the molar portion of the cations of chromium (in % by cation) to the molar portion of the cations of cobalt (in % by cation) is in a range of >1:1 to 5:1, such as of 1.25:1 to 4:1, of 1.5:1 to 3:1, or of 2.0:1 to 2.5:1. The molar portion of the cations of chromium (in % by cation) to the molar portion of the cations of cobalt (in % by cation) may, for example, be >1:1, at least 1.25:1, at least 1.5:1, or at least 2.0:1. The molar portion of the cations of chromium (in % by cation) to the molar portion of the cations of cobalt (in % by cation) may, for example, be at most 5:1, at most 4:1, at most 3:1, or at most 2.5:1.

It has been shown that the solubility of the cations of cobalt and chromium can considerably be increased when cations of sodium and potassium are present in a considerable molar excess. In some embodiments, the ratio of the sum of the molar portions of the cations of sodium and potassium (in % by cation) to the sum of the molar portions of the cations of cobalt and chromium (in % by cation) is in a range of 25:1 to 150:1, such as of 30:1 to 125:1, of 35:1 to 100:1, of 40:1 to 90:1, of 45:1 to 80:1, for example 50:1 to 75:1 or 55:1 to 70:1. The ratio of the sum of the molar portions of the cations of sodium and potassium (in % by cation) to the sum of the molar portions of the cations of cobalt and chromium (in % by cation) may, for example, be at least 25:1, at least 30:1, at least 35:1, at least 40:1, at least 45:1, at least 50:1, or at least 55:1. The ratio of the sum of the molar portions of the cations of sodium and potassium (in % by cation) to the sum of the molar portions of the cations of cobalt and chromium (in % by cation) may, for example, be at most 150:1, at most 125:1, at most 100:1, at most 90:1, at most 80:1, at most 75:1, or at most 70:1.

The glasses provided according to the present invention may comprise further components.

The glasses provided according to the present invention may comprise cations of magnesium (in particular $Mg^{2+}$) in a portion of 0 to 5% by cation, for example of 0.1 to 2% by cation or of 0.2 to 1% by cation. The portion of cations of magnesium may, for example, be 0 to 2.5% by cation or 0.5 to 1.5% by cation. The glasses provided according to the present invention may be free of cations of magnesium. The amount of cations of magnesium may, for example, be at least 0.1 cat.-%, at least 0.2 cat.-%, or at least 0.5 cat.-%. The amount of cations of magnesium may, for example, be at most 5 cat.-%, at most 2.5 cat.-%, at most 2 cat.-%, at most 1.5 cat.-%, or at most 1 cat.-%.

The glasses provided according to the present invention may comprise cations of calcium (in particular Ca') in a portion of 0 to 15% by cation, for example of 0.1 to 12% by cation, of 0.2 to 10% by cation or of 0.5 to 7.5% by cation. The portion of cations of calcium may be 2 to 9% by cation or 4 to 8% by cation. In some embodiments, the portion of cations of calcium is, for example, 0 to 5% by cation, 0 to 1% by cation or 0.25 to 1.5% by cation. In some embodiments, the portion of cations of calcium is lower than 0.5% by cation or lower than 0.1% by cation. The glasses provided according to the present invention may be free of cations of calcium. The amount of cations of calcium may, for example, be at least 0.1 cat.-%, at least 0.2 cat.-%, at least 0.25 cat.-%, at least 0.5 cat.-%, or at least 2 cat.-%. The amount of cations of calcium may, for example, be at most 15 cat.-%, at most 12 cat.-%, at most 10 cat.-%, at most 9 cat.-%, at most 8 cat.-%, at most 7.5 cat.-%, at most 5 cat.-%, at most 1.5 cat.-%, or at most 1 cat.-%.

The glasses provided according to the present invention may comprise cations of strontium (in particular $Sr^{2+}$) in a portion of 0 to 5% by cation, for example of 0.1 to 2% by cation or of 0.2 to 1% by cation. The portion of cations of strontium may, for example, be 0 to 2.5% by cation or 0.5 to 1.5% by cation. In some embodiments, the portion of cations of strontium is at most 5% by cation, such as at most 2.5% by cation, at most 2% by cation, at most 1.5% by cation, or at most 1% by cation. In some embodiments, the glasses provided according to the present invention are free of cations of strontium. The amount of cations of strontium may, for example, be at least 0.1 cat.-%, at least 0.2 cat.-%, or at least 0.5 cat.-%.

The glasses provided according to the present invention may comprise cations of barium (in particular $Ba^{2+}$) in a portion of 0 to 5% by cation, for example of 0.1 to 2% by cation or of 0.2 to 1% by cation. The portion of cations of barium may, for example, be 0 to 2.5% by cation or 0.5 to 1.5% by cation. In some embodiments, the portion of cations of barium is at most 5% by cation, such as at most 2.5% by cation, at most 2% by cation, at most 1.5% by cation, or at most 1% by cation. In some embodiments, the glasses provided according to the present invention are free of cations of barium. The amount of cations of barium may, for example, be at least 0.1 cat.-%, at least 0.2 cat.-%, or at least 0.5 cat.-%.

The glasses provided according to the present invention may comprise cations of zinc (in particular $Zn^{2+}$) in a portion of 0 to 10% by cation, for example of 0.5 to 7.5% by cation or of 1 to 5% by cation. The portion of cations of zinc may, for example, be 2 to 10% by cation or 4 to 8% by cation. The glasses provided according to the present invention may be free of cations of zinc. Cations of zinc may in particularly compromise the chemical stability. On the other hand, cations of zinc may be advantageous for the meltability. The amount of cations of zinc may, for example, be at least 0.5 cat.-%, at least 1 cat.-%, at least 2 cat.-%, or at least 4 cat.-%. The amount of cations of zinc may, for example, be at most 10 cat.-%, at most 8 cat.-%, at most 7.5 cat.-%, or at most 5 cat.-%.

In some embodiments, the sum of the portions of the cations of magnesium, calcium, strontium, barium and zinc is in a range of 0 to 15% by cation, for example of 1 to 10% by cation, of 2 to 8% by cation or of 3 to 7% by cation. The portion may, in particular, be limited for improving the devitrification properties. The sum of the portions of the cations of magnesium, calcium, strontium, barium and zinc may be at most 15% by cation, such as at most 14% by cation, at most 13% by cation, at most 12% by cation, at most 11% by cation, at most 10% by cation, at most 9% by cation, at most 8% by cation, or at most 7% by cation. The sum of the portions of the cations of magnesium, calcium, strontium, barium and zinc may, for example, be at least 1 cat.-%, at least 2 cat.-%, or at least 3 cat.-%.

The glasses provided according to the present invention may comprise cations of zirconium (in particular $Zr^{4+}$) in a portion of 0 to 10% by cation, for example of 0.1 to 7.5% by cation or of 0.5 to 5% by cation. The portion of cations of zirconium may, for example, be 0 to 1% by cation. Cations of zirconium may increase the devitrification stability of the glasses. In some embodiments, the portion of cations of zirconium is 1 to 9% by cation, 1.5 to 8.5% by cation or 2 to 8% by cation, for example at least 3% by cation, at least 4% by cation or at least 5% by cation. In some embodiments, the portion of cations of zirconium is lower than 0.5% by cation or lower than 0.1% by cation. The glasses provided according to the present invention may be free of cations of zirconium. The amount of cations of zirconium may, for example, be at least 0.1 cat.-%, at least 0.5 cat.-%, at least 1 cat.-%, at least 1.5 cat.-%, at least 2 cat.-%, at least 3 cat.-%, at least 4 cat.-%, or at least 5 cat.-%. The amount of cations of zirconium may, for example, be at most 10 cat.-%, at most 9 cat.-%, at most 8.5 cat.-%, at most 8 cat.-%, at most 7.5 cat.-%, or at most 5 cat.-%.

The glasses provided according to the present invention may comprise cations of titanium (in particular $Ti^{4+}$) in a portion of 0 to 10% by cation, for example of 0.5 to 8% by cation, of 0.75 to 6.5% by cation or of 1 to 5% by cation. The glasses provided according to the present invention may be free of cations of titanium. The amount of cations of titanium may, for example, be at least 0.5 cat.-%, at least 0.75 cat.-%, or at least 1 cat.-%, The amount of cations of titanium may, for example, be at most 10 cat.-%, at most 8 cat.-%, at most 6.5 cat.-%, or at most 5 cat.-%.

In some embodiments, the glasses provided according to the present invention are free of cations of antimony and/or arsenic.

When in this disclosure is mentioned that the glass is free of a component or does not contain a certain component, then this means that it is only allowed for this component to be present as an impurity in the glass. This means that it is not added in substantial amounts. According to the present invention, not substantial amounts are amounts of less than 0.02% by cation (200 ppm), such as less than 0.01% by cation (100 ppm), less than 0.005% by cation (50 ppm), or less than 0.001% by cation (10 ppm).

In some embodiments, at least 90% by cation, such as at least 95% by cation, at least 98% by cation, at least 99% by cation, at least 99.5% by cation, or at least 99.9% by cation of the cations of the glass are selected from cations of the group consisting of cations of silicon, boron, aluminum, sodium, potassium, magnesium, calcium, zinc, zirconium, titanium, chromium and cobalt.

Due to their optical properties, the glasses provided according to the present invention are in particularly suitable as glazing for a LIDAR housing. Because the glasses provided according to the present invention are characterized by a high transmittance in the NIR range and a low transmittance in the visible range, the glass can, for example, also be used in the fields of chemistry, space flight and traffic, in particular for optical sensors. There are also other uses in the field of packaging. The glass can also be used in other technical fields for technical or also special pharmaceutical uses as well as for glass tubes and glass articles with diverse geometrical shapes (for example tube, stick, pane, glass block).

When the sample thickness is 2 mm, the ratio of the minimum transmittance in the wavelength range of 850 nm to 950 nm to the maximum transmittance in the wavelength range of 250 nm to 700 nm is in a range of 1.9:1 to 15:1, for example of 1.95:1 to 10:1, of 2.00:1 to 7.5:1, of 2.1:1 to 5:1, of 2.2:1 to 4:1 or of 2.5:1 to 3.5:1. The transmittance may be determined in intervals of 1 nm in the mentioned ranges. From that, for the respective range the minimum and maximum transmittance, respectively, are determined and the respective ratio is calculated.

In some embodiments, the transmittance in the whole wavelength range of 850 nm to 950 nm is at least 75%, at least 76%, at least 77%, at least 78%, at least 79%, or at least 80%. In some embodiments, the minimum transmittance in the wavelength range of 850 nm to 950 nm is in a range of 75% to 99%, for example of 76% to 95%, of 77% to 92.5%, of 78% to 91%, of 79% to 90% or of 80% to 89%.

In some embodiments, the transmittance in the whole wavelength range of 880 nm to 930 nm is at least 75%, at least 76%, at least 77%, at least 78%, at least 79%, or at least 80%. In some embodiments, the minimum transmittance in the wavelength range of 880 nm to 930 nm is in a range of 75% to 99%, for example of 76% to 95%, of 77% to 92.5%, of 78% to 91%, of 79% to 90% or of 80% to 89%.

In some embodiments, the transmittance in the whole wavelength range of 250 nm to 700 nm is at most 50%, at most 45%, at most 40%, or at most 35%. In some embodiments, the maximum transmittance in the wavelength range of 250 nm to 700 nm is in a range of 1% to 50%, for example of 10% to 45%, of 20% to 40% or of 25% to 35%.

When the sample thickness is 2 mm, the ratio of the mean transmittance in the wavelength range of 850 nm to 950 nm to the mean transmittance in the wavelength range of 250 nm to 700 nm is in a range of 2:1 to 30:1, for example of 2.5:1 to 25:1, of 3:1 to 20:1, of 4:1 to 15:1 or of 5:1 to 12:1. The transmittance may be determined in intervals of 1 nm in the mentioned ranges. From that, for the respective range the mean transmittance as the mean value of all transmittance values within this range is calculated.

In some embodiments, the mean transmittance in the wavelength range of 850 nm to 950 nm is at least 75%, at least 76%, at least 77%, at least 78%, at least 79%, or at least 80%. In some embodiments, the mean transmittance in the wavelength range of 850 nm to 950 nm is in a range of 75% to 99%, for example of 76% to 95%, of 77% to 92.5%, of 78% to 91%, of 79% to 90% or of 80% to 89%.

In some embodiments, the mean transmittance in the wavelength range of 880 nm to 930 nm is at least 75%, at least 76%, at least 77%, at least 78%, at least 79%, or at least 80%. In some embodiments, the mean transmittance in the wavelength range of 880 nm to 930 nm is in a range of 75% to 99%, for example of 76% to 95%, of 77% to 92.5%, of 78% to 91%, of 79% to 90% or of 80% to 89%.

In some embodiments, the mean transmittance in the wavelength range of 250 nm to 700 nm is at most 25%, at most 22.5%, at most 20%, or at most 15%. In some embodiments, the mean transmittance in the wavelength range of 250 nm to 700 nm is in a range of 0.1% to 25%, for example of 1% to 22.5%, of 2% to 20% or of 4% to 15%.

The transmittance properties of the glasses can also be analyzed such that the mean transmittance in subranges having a width of 20 nm within the larger wavelength ranges of 250 nm to 700 nm and 850 nm to 950 nm, respectively, is determined. For that, the transmittance is at first determined in intervals of 1 nm in the mentioned ranges. From that, for each subrange having a width of 20 nm within the larger wavelength ranges of 250 nm to 700 nm and 850 nm to 950 nm, respectively, the mean transmittance as the mean value of all 21 transmittance values within the respective subrange is calculated. Thus, 431 subranges in the range of 250 to 700 nm and 81 subranges in the range of 850 to 950 nm may be analyzed.

In some embodiments, the ratio of the mean transmittance of the subrange having a width of 20 nm with the lowest mean transmittance within the range of 850 to 950 nm and the mean transmittance of the subrange having a width of 20 nm with the highest mean transmittance within the range of 250 to 700 nm is in a range of 1.9:1 to 20:1, for example of 2:1 to 15:1, of 2.1:1 to 10:1, of 2.2:1 to 7.5:1, of 2.3:1 to 5:1 or of 2.5:1 to 4.5:1.

In some embodiments, the mean transmittance of the subrange having a width of 20 nm with the lowest mean transmittance within the range of 850 to 950 nm is at least 75%, at least 76%, at least 77%, at least 78%, at least 79%, or at least 80%. In some embodiments, the mean transmittance of the subrange having a width of 20 nm with the lowest mean transmittance within the range of 850 to 950 nm is in a range of 75% to 99%, for example of 76% to 95%, of 77% to 92.5%, of 78% to 91%, of 79% to 90% or of 80% to 89%.

In some embodiments, the mean transmittance of the subrange having a width of 20 nm with the highest mean transmittance within the range of 250 to 700 nm is at most 50%, at most 45%, at most 40%, or at most 35%. In some embodiments, the mean transmittance of the subrange having a width of 20 nm with the highest mean transmittance within the range of 250 to 700 nm is in a range of 1% to 50%, for example of 10% to 45%, of 15% to 40% or of 20% to 35%.

Unless otherwise stated, the transmittance data which are given in the present disclosure are not internal transmission values, because they also comprise reflection losses.

The glasses provided according to the present invention do not only have excellent optical properties. The glasses provided according to the present invention are also characterized by a particularly high crystallization resistance. This is of high importance for the production in a tube-drawing method. Otherwise, it is possible that devitrification crystals are formed, in particular at the glass surface, so that, for example, the shaping of the glass is compromised. Therefore, the glasses have good devitrification stability. This is particularly important for large sizes and thick walls.

A measure for the crystallization resistance is the maximum crystallization rate $KG_{max}$. The lower the $KG_{max}$, the higher the crystallization resistance. In the present disclosure, the terms "crystallization resistance" and "devitrification stability" are used in a synonymous sense. $KG_{max}$ describes the maximum crystallization rate (normally in µm/min). The measurement of the crystallization rate is known. The crystallization rate may be measured along formed crystals, i.e. along their largest dimension.

According to the present invention, "UEG" is understood as the so-called lower devitrification limit. This is the temperature at which under increasing temperature regimen the devitrification of the material starts. Above a certain temperature which is referred to as upper devitrification limit (OEG) or liquidus temperature also after a longer time no crystals are formed. Normally, for different glasses the numerical values of UEG and OEG are different.

When crystallization takes place, then it happens at temperatures above the lower devitrification limit (UEG) and below the upper devitrification limit (OEG), thus in a range between UEG and OEG. Thus, the temperature at which the maximum crystallization rate is achieved is also between UEG and OEG. For determining the maximum crystallization rate $KG_{max}$, thus it is necessary to heat the glass to a temperature between UEG and OEG. Since for a given glass normally it is not known where exactly in the range between UEG and OEG the maximum crystallization takes place, often different temperatures within this range are tested for determining $KG_{max}$. In this way also UEG and OEG themselves can be determined as the lower and upper limit of the range, respectively, in which crystallization takes place.

In particular, the crystallization rate is determined by thermally treating the glass for an exposure time of one hour in a gradient furnace with increasing temperature regimen. A gradient furnace is a furnace with different heating zones, thus a furnace with different temperature ranges. Increasing temperature regimen means that the temperature of the glass, before it is inserted into the gradient furnace, is lower than the temperatures in all regions of the furnace. Thus, by the insertion into the furnace the temperature of the glass increases, regardless of the region of the furnace into which the glass is inserted. Thus, the devitrification measurement is in particularly conducted by a thermal treatment of one hour in an (already hot) gradient furnace which is separated into different temperature zones. Here, the temperature gradient in the gradient furnace is a space-resolved and not a time-resolved gradient, because the gradient furnace is separated into different temperature zones in a space-resolved manner.

By the fact that the gradient furnace is separated into several heating zones, it is possible that different temperatures can be tested at the same time. This is a particular advantage of a gradient furnace. For example, the lowest temperature may be 950° C. and the highest temperature may be 1250° C., or the lowest temperature may be 700° C. and the highest temperature may be 1000° C. The temperatures should be chosen such that the crystallization rate at different temperatures in the range between UEG and OEG can be determined so that by a comparison of the potentially different crystallization rates within the range between UEG and OEG, the highest of the crystallization rates can be determined as the maximum crystallization rate $KG_{max}$. When UEG and OEG are not known, then advantageously temperatures in a relatively large range are tested for allowing a determination of UEG and OEG.

Thus, the fact that the glass has a maximum crystallization rate ($KG_{max}$) of at most 0.20 µm/min in a temperature range of 700° C. to 1250° C., when the glass is thermally treated for an exposure time of one hour in a gradient furnace with increasing temperature regimen, does not mean that in the gradient furnace temperatures in the whole range of 700° C. to 1250° C. have to be present. When, for example, for a certain glass is known that OEG is 1000° C., then in the gradient furnace temperatures of higher than 1000° C. have not to be tested, because at these temperatures then in any case no crystallization takes place so that the maximum crystallization rate $KG_{max}$ has to appear below 1000° C. It is also true, for example, that in the gradient furnace temperatures of lower than 950° C. have not to be tested, when for a glass is known that UEG is 950° C., because at these temperatures then in any case no crystallization takes place so that the maximum crystallization rate $KG_{max}$ has to appear above 950° C.

When no devitrification takes place, then there is no crystallization so that it is not possible to determine $KG_{max}$. In this case for $KG_{max}$ a value of 0 µm/min can be assumed.

The crystallization rate may be determined by the use of glass grains, in particular of glass grains having a diameter of 1.6 mm to 4 mm. For the thermal treatment in the gradient furnace, the glass grains may be placed on a carrier, for example a platinum carrier. The carrier may comprise recesses, in particular respectively one for accommodating one glass grain, and a hole at the bottom side of each recess so that the crystallization rate after the thermal treatment can be determined with a microscope. With regard to the preferred size of the glass grains, the recesses may have a diameter of 4 mm each and the holes have a diameter of 1 mm each. After the thermal treatment, it is possible to determine with a microscope in which temperature range which crystallization rate has appeared. The highest crystallization rate which is determined is the maximum crystallization rate $KG_{max}$. UEG and OEG can be determined as lower and upper limit of the temperature range, respectively, in which crystallization has taken place. The assignment of the single glass grains to the different temperature zones in the gradient furnace is no problem, since it is known at which position in the furnace which temperature prevails and at which position in the furnace which glass grain was present.

The glasses provided according to the present invention have such a high devitrification stability that the maximum crystallization rate ($KG_{max}$) may be at most 0.20 µm/min in a temperature range of 700° C. to 1250° C., in particular, when the glass is thermally treated for an exposure time of one hour in a gradient furnace with increasing temperature regimen. In some embodiments, $KG_{max}$ is at most 0.15 µm/min, such as at most 0.10 µm/min, at most 0.05 µm/min, at most 0.04 µm/min, at most 0.03 µm/min, at most 0.02 µm/min, or at most 0.01 µm/min. In some embodiments, there is no devitrification, when the glass is thermally treated for an exposure time of one hour in a gradient furnace with increasing temperature regimen, so that $KG_{max}$ is 0 µm/min.

In some embodiments, $KG_{max}$ in a temperature range of 700° C. to 1250° C., for example of 700° C. to 1205° C., of 700° C. to 1190° C., of 700° C. to 1115° C., of 885° C. to 1190° C., of 835° C. to 1140° C., and/or of 1060° C. to 1155° C. is at most 0.20 µm/min, such as at most 0.15 µm/min, at most 0.10 µm/min, at most 0.05 µm/min, at most 0.04 µm/min, at most 0.03 µm/min, at most 0.02 µm/min, or at most 0.01 µm/min, in particular, when the glass is thermally treated for an exposure time of one hour in a gradient furnace with increasing temperature regimen. In some embodiments, in a temperature range of 700° C. to 1190° C., for example of 700° C. to 1115° C., of 885° C. to 1190° C., of 835° C. to 1140° C., and/or of 1060° C. to 1155° C. no devitrification takes place, in particular, when the glass is thermally treated for an exposure time of one hour in a gradient furnace with increasing temperature regimen, so that $KG_{max}$ is 0 µm/min.

Due to its excellent devitrification stability, the glass provided according to the present invention can be prepared in each known glass shaping method, in particular in tube-drawing methods, for example in the Danner method, in the Vello method or in the A-drawing method (vertical drawing method).

Furthermore, the glasses provided according to the present invention have a particularly high hydrolytic stability, in particular a hydrolytic stability according to the hydrolytic class 1 according to USP660, ISO719 and/or ISO720. In some embodiments, the glasses have a hydrolytic stability HGB1 according to ISO719. In some embodiments, the glasses have a hydrolytic stability HGA1 according to ISO720:1985. In some embodiments, the glasses have a hydrolytic stability of the type I according to USP660/glass grains. In some embodiments, the glasses have a hydrolytic stability which conforms to at most 90%, such as at most 89%, at most 88%, at most 87%, at most 85%, at most 80%, at most 75%, or at most 70% of the limit value of type I according to USP660/glass grains. The limit value of type I conforms to 0.10 ml 0.02 N HCl.

It is a particular advantage of the glasses provided according to the present invention that they combine advantageous transmittance properties with an excellent crystallization resistance and an excellent hydrolytic stability.

In some embodiments, the glasses provided according to the present invention are chemically temperable. So, for example, the stability toward environmental influences such as in particular hail can be increased. Chemical tempering comprises in particular an ion exchange treatment, in particular an exchange of smaller ions with larger ions. Normally, sodium ions are exchanged with potassium ions, wherein in particular a treatment in potassium salt is conducted, for example in a bath of $KNO_3$.

A measure for the temperability is the diffusivity D (also referred to as threshold of the diffusivity D or threshold diffusivity D). The diffusivity D can be calculated from the depth of layer (DoL) and the chemical tempering time t according to the following formula:

$$DoL=1.4*(4*D*t)^{1/2}$$

In the present disclosure, D is given for chemical tempering in $KNO_3$ at 450° C. for 9 hours. The mention of the diffusivity does not mean that a glass in fact has been thermally tempered. Rather, the diffusivity is a measure for the temperability of a glass.

In some embodiments, the diffusivity D is in a range of 5 to 50 $\mu m^2$ per hour, such as of 7.5 to 40 $\mu m^2$ per hour, of 10 to 30 $\mu m^2$ per hour, or of 15 to 25 $\mu m^2$ per hour. The diffusivity D may, for example, be at least 5 $\mu m^2$ per hour, at least 7.5 $\mu m^2$ per hour, at least 10 $\mu m^2$ per hour, or at least 15 $\mu m^2$ per hour. The diffusivity D may, for example, be at most 50 $\mu m^2$ per hour, at most 40 $\mu m^2$ per hour, at most 30 $\mu m^2$ per hour, or at most 25 $\mu m^2$ per hour.

In some embodiments, the glasses provided according to the present invention have a relatively low density, in particular in a range of 2.20 to 2.80 $g/cm^3$, such as 2.25 to 2.75 $g/cm^3$ or of 2.30 to 2.70 $g/cm^3$. The density may, for example, be at least 2.20 $g/cm^3$, at least 2.25 $g/cm^3$, or at least 2.30 $g/cm^3$. The density may, for example, be at most 2.80 $g/cm^3$, at most 2.75 $g/cm^3$, or at most 2.70 $g/cm^3$.

The coefficient of thermal expansion (CTE) in the temperature range of 20° C. to 300° C. may be in a range of 4 to 9 ppm/K, such as 4.5 to 8.5 ppm/K or 5 to 8 ppm/K. The CTE may, for example, be at least 4 ppm/K, at least 4.5 ppm/K, or at least 5 ppm/K. The CTE may, for example, be at most 9 ppm/K, at most 8.5 ppm/K, or at most 8 ppm/K.

In some embodiments, the glass transition temperature $T_g$ is in a range of 450° C. to 700° C., such as of 475° C. to 685° C. or of 500° C. to 675° C. The glass transition temperature $T_g$ may, for example, be at least 450° C., at least 475° C., or at least 500° C. The glass transition temperature $T_g$ may, for example, be at most 700° C., at most 685° C., or at most 675° C.

In some embodiments, the processing temperature VA (also referred to as working temperature) is in a range of 1000° C. to 1250° C., such as of 1025° C. to 1225° C. The processing temperature VA may, for example, be at least 1000° C., or at least 1025° C. The processing temperature VA may, for example, be at most 1250° C., or at most 1225° C.

The temperature T2 at which the viscosity is $10^2$ dPas may be in a range of 1250° C. to 1750° C., for example 1300° C. to 1500° C. or 1350° C. to 1450° C. The temperature T2 may, for example, be at least 1250° C., at least 1300° C., or at least 1350° C. The temperature T2 may, for example, be at most 1750° C., at most 1500° C., or at most 1450° C.

Exemplary embodiments provided according to the present invention also relate to a glass article which comprises the glass provided according to the present invention. In some embodiments, the glass article has a thickness of at most 5 mm, for example at most 4 mm, at most 3 mm or at most 2 mm. In some embodiments, the thickness of the glass article is in a range of 0.02 mm to 5 mm, for example 0.03 mm to 4 mm, 0.05 mm to 3 mm or 0.07 mm to 2 mm. The thickness may, for example, be at least 0.02 mm, at least 0.03 mm, at least 0.05 mm, or at least 0.07 mm. The glass article may exist in diverse geometrical shapes, such as, for example, as tube, stick, pane, foil or glass block. In the case of a glass tube, the thickness of the glass article is the wall thickness of the tube.

The glass article may contain, in addition to the glass provided according to the present invention, further layers, in particular one or several antireflection layers, heatable layers, autocleaning layers (in particular hydrophobic or oleophobic) and/or scratch-resistant layers (in particular on the outer side).

Exemplary embodiments provided according to the present invention also relate to a method for the production of a glass or glass article provided according to the present invention. The method comprises:
melting of the glass raw materials,
treating of the glass melt, in particular by down draw, overflow fusion, redrawing, floating or tube-drawing, in particular Danner method, Vello method or A-drawing method (vertical drawing method), and
cooling of the obtained glass or glass article.

Due to its excellent devitrification stability it is possible that the glass provided according to the present invention can be produced in tube-drawing methods, in particular in the Danner method, in the Vello method or in the A-drawing method (vertical drawing method). The A-drawing method may be preferred, because with this method particularly large tube diameters can be achieved, for example outer diameters of more than 30 mm or more than 50 mm. In some embodiments, the outer diameter is at most 500 mm.

In some embodiments, the method comprises chemically hardening of the glass or glass article, in particular by ion exchange. In some embodiments, the chemical hardening comprises an ion exchange (such as in a bath of $KNO_3$), in particular at temperatures of 320° C. to 700° C., such as of 400° C. to 500° C. The length of time of the chemical hardening (in particular the time of the ion exchange treatment) may be in a range of 5 minutes to 48 hours, such as of 1 hour to 24 hours, of 4 hours to 15 hours, or of 5 hours to 12 hours. Chemical hardening for 9 hours at 450° C. may be utilized.

Exemplary embodiments provided according to the present invention also relate to the use of the glass or glass article provided according to the present invention, for example in the fields of chemistry, space flight and traffic, in particular for optical sensors. Also the use in double sensor systems is provided according to the present invention. Exemplary embodiments provided according to the present invention also relate to the use of the glass or glass article as packaging. Exemplary embodiments provided according to the present invention also relate to technical or also pharmaceutical uses of the glass or glass article. The glass or glass article may be used in the field of LIDAR, in particular as glazing for a LIDAR housing or LIDAR covering.

Examples

Exemplary embodiments provided according to the present invention are explained with the help of examples.

Glass Compositions

The following Table 1 shows the glass compositions of the example glasses 1 to 4 provided according to the present invention as well as of the two comparative examples comparison 1 and comparison 2 in % by cation. Thus, specified is the relative molar portion of the cations of the mentioned components each in relation to the total amount of the cations of the glass.

TABLE 1

| Component | Ex. 1 | Ex. 2 | Ex. 3 | Ex. 4 | Comparison 1 | Comparison 2 |
|---|---|---|---|---|---|---|
| silicon | 65.7 | 62.8 | 57.4 | 55.4 | 59.9 | 60.8 |
| boron | 17.2 | 7.5 | 12.9 | | | |
| aluminum | | 10.2 | 4.4 | 19.1 | 15.5 | 18.7 |
| sodium | 5.4 | 16.8 | 11.1 | 15.8 | 7.0 | |
| potassium | 8.0 | 1.1 | 7.8 | 1.9 | | |
| magnesium | | 0.6 | | 0.4 | 8.7 | |
| calcium | | 0.6 | | 6 | 8.8 | 13.9 |
| strontium | | | | | | 1.4 |
| zinc | | | 3.5 | | | 4.2 |
| zirconium | 3.4 | | | 1 | | 1 |
| titanium | | | 2.6 | | | |
| chromium | 0.20 | 0.19 | 0.20 | 0.20 | | |
| cobalt | 0.09 | 0.08 | 0.09 | 0.09 | | |

The example glasses 1 to 4 are tube-drawable. The comparative examples 1 and 2, however, are characterized by a tendency to devitrification which is too high. The maximum crystallization rate $KG_{max}$ of both comparative examples 1 and 2 is 0.8 μm/min each, when the glasses are thermally treated for an exposure time of one hour in a gradient furnace with increasing temperature regimen.

Optical Properties

The optical properties of the examples glasses provided according to the present invention were measured on samples with a wall thickness of ca. 2 mm (1.96 to 2.01 mm). Since the spectra can be compared only in the case of exactly the same sample thickness, thicknesses which deviated from 2 mm were converted into 2 mm each.

The glasses provided according to the present invention have low transmittance in the visible range and high transmittance in the NIR range. For each of the examples 1 to 4, two samples each were investigated. Exemplary transmittance curves are shown for one of both samples of the examples 1 to 4 each in the sole FIGURE. In the following, a detailed analysis of the transmittance properties is shown. The given transmittance values are not internal transmission values, because they also comprise reflection losses.

Maximum and Minimum Transmittance

The following Table 2 shows the minimum transmittance in a wavelength range of 850 to 950 nm, the maximum transmittance in a wavelength range of 250 to 700 nm, as well as the ratio of both values. The transmittance was measured in intervals of 1 nm in the mentioned ranges. From that for the respective range the minimum and maximum transmittance, respectively, was determined and the corresponding ratio was calculated.

The following tables show rounded values. Since the given ratio has been calculated based on the not rounded transmittance values, there may be deviations, when a comparison is made with ratios which are calculated with the given rounded transmittance values. For each example glass (ex. 1 to ex. 4) the results of both examined samples (smp. 1 and smp. 2) each are shown.

TABLE 2

| | Maximum transmittance in the wavelength range of 250 to 700 nm ($Max_{250-700\,nm}$) | Minimum transmittance in the wavelength range of 850 to 950 nm ($Min_{850-950\,nm}$) | Ratio of $Min_{850-950\,nm}$ and $Max_{250-750\,nm}$ |
|---|---|---|---|
| ex. 1, smp. 1 | 35% | 79% | 2.29 |
| ex. 1, smp. 2 | 33% | 79% | 2.38 |
| ex. 2, smp. 1 | 44% | 88% | 2.00 |
| ex. 2, smp. 2 | 44% | 88% | 1.99 |
| ex. 3, smp. 1 | 26% | 83% | 3.15 |
| ex. 3, smp. 2 | 27% | 84% | 3.16 |
| ex. 4, smp. 1 | 30% | 81% | 2.70 |
| ex. 4, smp. 2 | 30% | 82% | 2.69 |

For all examples and samples, the minimum transmittance in the wavelength range of 850 nm to 950 nm was considerably higher than the maximum transmittance in the wavelength range of 250 nm to 750 nm. Thus, the examples have the transmittance properties according to the present invention.

Mean Transmittance

The following Table 3 shows the mean transmittance in a wavelength range of 850 to 950 nm, the mean transmittance in a wavelength range of 250 to 700 nm, as well as the ratio of both values. The transmittance was determined in intervals of 1 nm in the mentioned ranges. From that for the respective range the mean transmittance was calculated as the mean value of all transmittance values within the range.

TABLE 3

| | Mean transmittance in the wavelength range of 250 to 700 nm ($MW_{250-700\,nm}$) | Mean transmittance in the wavelength range of 850 to 950 nm ($MW_{850-950\,nm}$) | Ratio of $MW_{850-950\,nm}$ and $MW_{250-750\,nm}$ |
|---|---|---|---|
| ex. 1, smp. 1 | 15% | 82% | 5.32 |
| ex. 1, smp. 2 | 15% | 82% | 5.54 |
| ex. 2, smp. 1 | 18% | 89% | 4.99 |
| ex. 2, smp. 2 | 18% | 89% | 4.93 |
| ex. 3, smp. 1 | 6% | 85% | 13.30 |
| ex. 3, smp. 2 | 6% | 85% | 13.44 |
| ex. 4, smp. 1 | 8% | 82% | 10.69 |
| ex. 4, smp. 2 | 8% | 83% | 10.75 |

For all examples and samples, the mean transmittance in the wavelength range of 850 nm to 950 nm was considerably higher than the mean transmittance in the wavelength range of 250 nm to 750 nm. Thus, the examples have the transmittance properties according to the present invention.

Mean Transmittance in Subranges

Furthermore, the transmittance properties of the glasses were analyzed by determining the mean transmittance in subranges having a width of 20 nm within the larger wavelength ranges of 250 nm to 700 nm and 850 nm to 950 nm, respectively.

The transmittance was determined in intervals of 1 nm in the mentioned ranges. From that, for each subrange having a width of 20 nm within the larger wavelength ranges of 250 nm to 700 nm and 850 nm to 950 nm, respectively, the mean transmittance was calculated as the mean value of all 21 transmittance values within the respective subrange. For each sample, 431 subranges in the range of 250 to 700 nm and 81 subranges in the range of 850 to 950 nm were analyzed.

The following Table 4 shows the mean transmittance of the subrange with the lowest mean transmittance within the range of 850 to 950 nm and the mean transmittance of the subrange with the highest mean transmittance within the range of 250 to 700 nm. Also the ratio of both values is shown.

TABLE 4

|  | Highest mean transmittance of a subrange in the wavelength range of 250 to 700 nm (TB-$Max_{250-700\ nm}$) | Lowest mean transmittance of a subrange in the wavelength range of 850 to 950 nm (TB-$Min_{250-700\ nm}$) | Ratio of TB-$Min_{850-950\ nm}$ and TB-$Max_{250-750\ nm}$ |
|---|---|---|---|
| ex. 1, smp. 1 | 34% | 80% | 2.39 |
| ex. 1, smp. 2 | 32% | 80% | 2.48 |
| ex. 2, smp. 1 | 43% | 88% | 2.06 |
| ex. 2, smp. 2 | 43% | 88% | 2.06 |
| ex. 3, smp. 1 | 20% | 84% | 4.25 |
| ex. 3, smp. 2 | 20% | 85% | 4.29 |
| ex. 4, smp. 1 | 21% | 81% | 3.84 |
| ex. 4, smp. 2 | 21% | 82% | 3.83 |

Also in the case of an analysis of the subranges, for all examples and samples, the results show that the minimum transmittance in the wavelength range of 850 nm to 950 nm is considerably higher than the maximum transmittance in the wavelength range of 250 nm to 750 nm. Thus, the examples have the transmittance properties according to the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, having a maximum crystallization rate ($KG_{max}$) of at most 0.20 μm/min in a temperature range of 700° C. to 1250° C. and a hydrolytic stability according to a hydrolytic class 1 HGA1 according to ISO 720:1985, wherein in the case of a sample thickness of 2 mm of the glass a ratio of a minimum transmittance in a wavelength range of 850 nm to 950 nm to a maximum transmittance in a wavelength range of 250 nm to 700 nm is in a range of 1.9:1 to 15:1, wherein the glass comprises cations of the following components in the given portions (in % by cation):

| Component | Portion |
|---|---|
| silicon | 40-80 |
| boron | 0-20 |
| aluminum | 0-25 |
| sodium | 2-22 |
| potassium | 0.1-10 |
| chromium | 0.05-0.5 |
| cobalt | 0.03-0.5; | wherein a sum of the portions of the cations of sodium and potassium is in a range of 10 to 25% by cation, wherein a sum of the portions of the cations of chromium and cobalt is in a range of 0.15 to 0.55% by cation, and wherein a sum of the portions of the cations of magnesium, calcium, strontium, barium and zinc is at most 15% by cation, wherein a ratio of the sum of the portions of the cations of sodium and potassium to the sum of the portions of the cations of cobalt and chromium is in a range of 40:1 to 150:1.

2. The glass of claim 1, wherein the glass comprises cations of the following components in the given portions (in % by cation):

| Component | Portion |
|---|---|
| magnesium | 0-5 |
| calcium | 0-15 |
| strontium | 0-5 |
| barium | 0-5 |
| zinc | 0-10 |
| zirconium | 0-10 |
| titanium | 0-10. |

3. The glass of claim 1, wherein the glass has a diffusivity D in a range of 5 to 50 μm² per hour.

4. The glass of claim 1, wherein a transmittance in the whole wavelength range of 850 nm to 950 nm is at least 75%.

5. A glass article, comprising a glass and having a thickness in a range of 0.02 mm to 5 mm, the glass having a maximum crystallization rate ($KG_{max}$) of at most 0.20 inn/min in a temperature range of 700° C. to 1250° C. and a hydrolytic stability according to a hydrolytic class 1 HGA1 according to ISO 720:1985, wherein in the case of a sample thickness of 2 mm of the glass a ratio of a minimum transmittance in a wavelength range of 850 nm to 950 nm to a maximum transmittance in a wavelength range of 250 nm to 700 nm is in a range of 1.9:1 to 15:1, wherein the glass comprises cations of the following components in the given portions (in % by cation):

| Component | Portion |
|---|---|
| silicon | 40-80 |
| boron | 0-20 |
| aluminum | 0-25 |
| sodium | 2-22 |
| potassium | 0.1-10 |
| chromium | 0.05-0.5 |
| cobalt | 0.03-0.5; | wherein a sum of the portions of the cations of sodium and potassium is in a range of 10 to 25% by cation, wherein a sum of the portions of the cations of chromium and cobalt is in a range of 0.15 to 0.55% by cation, and wherein a sum of the portions of the cations of magnesium, calcium, strontium, barium and zinc is at most 15% by cation, wherein a ratio of the sum of the portions of the cations of sodium and potassium to the sum of the portions of the cations of cobalt and chromium is in a range of 40:1 to 150:1.

6. The glass article of claim 5, wherein the glass comprises cations of the following components in the given portions (in % by cation):

| Component | Portion |
|---|---|
| magnesium | 0-5 |
| calcium | 0-15 |
| strontium | 0-5 |
| barium | 0-5 |

-continued

| Component | Portion |
|---|---|
| zinc | 0-10 |
| zirconium | 0-10 |
| titanium | 0-10. |

7. The glass article of claim 5, wherein the glass has a diffusivity D in a range of 5 to 50 μm² per hour.

8. The glass article of claim 5, wherein a transmittance in the whole wavelength range of 850 nm to 950 nm is at least 75%.

9. A method for the production of a glass or a glass article comprising the glass, the method comprising:
melting glass raw materials to form a glass melt;
treating the glass melt to form a treated glass melt; and
cooling the treated glass melt to obtain the glass or the glass article comprising the glass, the glass having a maximum crystallization rate ($KG_{max}$) of at most 0.20 μm/min in a temperature range of 700° C. to 1250° C. and a hydrolytic stability according to a hydrolytic class 1 HGA1 according to ISO 720:1985, wherein in the case of a sample thickness of 2 mm of the glass a ratio of a minimum transmittance in a wavelength range of 850 nm to 950 nm to a maximum transmittance in a wavelength range of 250 nm to 700 nm is in a range of 1.9:1 to 15:1, wherein the glass comprises cations of the following components in the given portions (in % by cation):

| Component | Portion |
|---|---|
| silicon | 40-80 |
| boron | 0-20 |
| aluminum | 0-25 |
| sodium | 2-22 |
| potassium | 0.1-10 |
| chromium | 0.05-0.5 |
| cobalt | 0.03-0.5; | wherein a sum of the portions of the cations of sodium and potassium is in a range of 10 to 25% by cation, wherein a sum of the portions of the cations of chromium and cobalt is in a range of 0.15 to 0.55% by cation, and wherein a sum of the portions of the cations of magnesium, calcium, strontium, barium and zinc is at most 15% by cation, wherein a ratio of the sum of the portions of the cations of sodium and potassium to the sum of the portions of the cations of cobalt and chromium is in a range of 40:1 to 150:1.

10. The method of claim 9, further comprising:
chemically hardening the glass or the glass article by ion exchange.

11. The method of claim 9, wherein the treating comprises at least one of down draw, overflow fusion, redrawing, floating, tube-drawing, Danner method, Vello method or A-drawing method.

* * * * *